United States Patent [19]
Ueno et al.

[11] Patent Number: 4,778,245
[45] Date of Patent: Oct. 18, 1988

[54] OPTICAL COMMUNICATION CABLE

[75] Inventors: Katsuji Ueno, Hirakata; Hiroaki Sugimoto, Takatsuki; Kazuo Hayatsu, Ibaraki, all of Japan

[73] Assignees: Sumitomo Chemical Company, Limited; Japan Exlan Company, Ltd., both of Osaka, Japan

[21] Appl. No.: 800,776

[22] Filed: Nov. 22, 1985

[30] Foreign Application Priority Data

Dec. 12, 1984 [JP] Japan .................. 59-262050

[51] Int. Cl.$^4$ ............................................ G02B 6/44
[52] U.S. Cl. ............................................ 350/96.23
[58] Field of Search .................. 528/190; 523/216; 264/211, 171, 210.6, 331.21, 349; 524/246, 250, 255, 258; 350/96.23

[56] References Cited

U.S. PATENT DOCUMENTS 4,183,895 1/1980 Luise ........................ 528/191 X
4,581,399 4/1986 Yoon ........................ 524/246

FOREIGN PATENT DOCUMENTS 1125554 6/1982 Canada ........................ 350/96.23
60-71552 4/1985 Japan .
60-151259 8/1985 Japan .

Primary Examiner—John D. Lee
Assistant Examiner—John Ngo
Attorney, Agent, or Firm—Stevens, Davis, Miller & Mosher

[57] ABSTRACT

An optical communication cable with less breakage or damage during the preparation and handling which comprises an optical fiber strand, a tension-resistant material, and a synthetic resin coating layer, the tension-resistant material being provided between the optical fiber strand and the synthetic resin coating layer and being fibers obtained by melt spinning an aromatic polyester showing an anisotropy in the molten state.

1 Claim, 1 Drawing Sheet

OPTICAL COMMUNICATION CABLE

BACKGROUND OF THE INVENTION

This invention relates to a cable for use in optical communication as an indispensable communication means for the highly informationalized society.

With the recent switching over to the informationalized society, the surrounding technologies are also in rapid development. Among others, optical communication has many features such as a distinguished transmission capacity, being free from communication troubles due to electric discharge, lightning, electromagnetic induction, etc., and no use of precious copper, as compared with the electrical communication based on the conventional copper wires. Therefore optical communication is highly expected as an information transmission means.

Optical fibres made from quartz, glass, and transparent synthetic resin are used for strands. The former two are very brittle, and damaged or broken by an impact force suddenly applied thereto during the handling, and thus are usually used after coating with synthetic resins such as silicone resin, etc.

To prevent damage and breakage of the strands including the optical fibers based on the transparent synthetic resin due to elongation during the handling, a tension-resistant material or strength member is provided around the strand of optical fibers, and the tension-resistant material is further coated with a synthetic resin. An impact force applied thereto during the handling is borne on the tension-resistant material. As a tension-resistant material, copper wires, FRP wire, carbon fibers, aramid fibers, etc. have been so far used.

For the practical purpose, it is desirable that the optical communication cable is light in weight and thin, and in this respect the aramid fibers are preferable as the tension-resistant material, but have such problems as high moisture absorption and high cost owing to the production route through solution spinning. High tenacity fibers of polyethylene may be used, but has such a problem as restriction to the processing temperature for forming a synthetic resin coating. In addition, the synthetic resin-based optical fibers have such a problem as increase of transmission loss due to the heat when the synthetic resin coating is formed by extrusion. It is necessary that the tension-resistant material works as a heat-insulating material between the optical fiber strand and the outer synthetic resin coating.

SUMMARY OF THE INVENTION

An object of the present invention is to provide an optical communication cable with less damage or breakage during the preparation or handling.

Another object of the present invention is to provide a thin optical communication cable of light weight.

Other object of the present invention is to provide an optical communication cable of low cost with less transmission loss during the preparation.

According to the present invention, an optical communication cable comprising an optical fiber strand, a tension-resistant material and a synthetic resin coating, the tension-resistant material being provided between the optical fiber strands and the synthetic resin coating is provided, where fibers obtained by melt spinning an aromatic polyester showing an anisotropy in the molten state are used as the tension-resistant material.

The optical fiber strand for use in the present invention includes that of quartz-based, multi-component glass-based, and transparent synthetic resin-based optical fibers. The optical fiber strand is in such a structure that a core of higher refractive index is surrounded by a cladding of lower refractive index. The light that obliquely proceeds through the core undergoes total reflection at the boundary surface between the core and the cladding owing to an angle exceeding the critical angle and propagates through the core. Core and cladding of the quartz-based optical fiber strand are both made of pure quartz glass. To give a difference in the refractive index, phosphorus, aluminum, germanium, titanium, etc. may be added to the core, whereas boron, fluorine, etc. may be added to the cladding, or synthetic resin or other materials having a lower refractive index than that of the core may be used for the cladding.

Multi-component glass-based optical fiber strand contain sodium oxide, boron oxide, and thalium oxide besides $SiO_2$.

As the transparent synthetic resin-based optical fiber strand, polystyrene-based and polymethylmethacrylate-based optical fibers are used.

It is important to remove foreign matters and impurities from these optical fiber strand.

As the tension-resistant material, fibers obtained by melt spinning an aromatic polyester showing an anisotropy in the molten state are used in the present invention.

The aromatic polyester showing an anisotropy in the molten state is the one capable of transmitting light at a temperature, at which the aromatic polyester becomes flowable, when the powdery polyester sample is put and heated on a heating sample stage placed between two polarizing plates which are at right angles (90°) from each other. Examples of the aromatic polyester are those prepared from aromatic dicarboxylic acids, aromatic diols and/or aromatic hydroxycarboxylic acids, and their derivatives, as disclosed in Published Examined Japanese Patent Application Nos. 18016/1981, 20008/1980 and the like. If desired, aromatic polyesters may be copolymers prepared from the aforesaid compounds with alicyclic dicarboxylic acids, alicyclic diols, aliphatic diols and their derivatives.

Examples of the aromatic dicarboxylic acids are terephthalic acid, isophthalic acid, 4,4'-dicarboxydiphenyl, 2,6-dicarboxynaphthalene, 1,2-bis(4-carboxyphenoxy)ethane and their derivatives substituted on the nucleus with alkyl, aryl, alkoxy or halogen.

Examples of the aromatic diols are hydroquinone, resorcinol, 4,4'-dihydroxydiphenyl, 4,4'-dihydroxybenzophenone, 4,4'-dihydroxydiphenylmethane, 4,4'-dihydroxydiphenylethane, 2,2-bis(4-hydroxyphenyl)propane, 4,4'-dihydroxydiphenylether, 4,4'-dihydroxydiphenylsulfone, 4,4'-dihydroxydiphenylsulfide, 2,6-dihydroxynaphthalene, 1,5-dihydroxynaphthalene and their derivatives substituted on the nucleus with alkyl, aryl, alkoxy or halogen.

Examples of the aromatic hydroxycarboxylic acids are p-hydroxybenzoic acid, m-hydroxybenzoic acid, 2-hydroxynaphthalene-6-carboxylic acid, 1-hydroxynaphthalene-5-carboxylic acid and their derivatives substituted on the nucleus with alkyl, aryl, alkoxy or halogen.

Examples of the alicyclic dicarboxylic acids are trans-1,4-dicarboxycyclohexane, cis-1,4-dicarboxycyclohexane and their derivatives substituted on the nucleus with alkyl, aryl or halogen.

Examples of the alicyclic and aliphatic diols are trans-1,4-dihydroxycyclohexane, cis-1,4-dihydroxycyclohexane, ethylene glycol, 1,4-butanediol, xylylenediol and the like.

Of these aromatic polyesters prepared using a combination of the acid compounds and the hydroxyl compounds as described above, preferred as the tension-resistant material are:

(i) a copolyester comprising p-hydroxybenzoic acid residue (40 to 70 mole %), the aromatic dicarboxylic acid residue (15 to 30 mole %) and the aromatic diol residue (15 to 30 mole %), (ii) a copolyester prepared by the reaction of terephthalic acid and/or isophthalic acid with chlorohydroquinone, phenylhydroquinone and/or hydroquinone, (iii) a copolyester comprising p-hydroxybenzoic acid residue (20 to 80 mole %) and 2-hydroxynaphthalene-6-carboxylic acid residue (20 to 80 mole %), and so on.

In the preparation of the aromatic polyester usable for the present invention using the aforesaid starting material, said materials as such or after esterification with an aliphatic or aromatic monocarboxylic acid or its derivative, or an aliphatic alcohol, a phenol or its derivative, can be subjected to polycondensation reaction according to, for example, a bulk polymerization, solution polymerization or suspension polymerization method known in this art. The reaction can be carried out at a temperature ranging from 150° to 360° C. under atmospheric pressure or a reduced pressure ranging from 10 to 0.1 torr, if desired, in the presence of a polymerization catalyst such as Sb-, Ti- or Ge-containing compounds, a stabilizer such as phosphorus compounds and/or a filler such as $TiO_2$, $CaCO_3$, Talc and the like. The resulting polyester as such or after pulverization is heat-treated in an inert gas atmosphere or under a reduced pressure prior to the spinning. The polyester may be formed into a granule through an extruder.

The aromatic polyester usable in the present invention may be defined in terms of the molecular weight. However, there are problems such that depending on the composition and structure of the polymer, a solvent capable of dissolving the polymer uniformly can hardly be found, and accuracy in the measurement of molecular weight is questionable. Accordingly, the molecular weight cannot be used for the definition of the aromatic polyester usable in the present invention. For this reason, a "flowing temperature" is used therefor, which is a physical value corresponding to the molecular weight. In the present invention, the flowing temperature is defined to be a temperature, at which the aromatic polyester flows through a nozzle of 1 mm in diameter and 10 mm in length, and reaches an apparent viscosity of 48,000 poise, when heated at a rate of 4° C./min. under a pressure of 100 kg/cm² using flow tester CFT-500, manufactured by Shimadzu Seisakusho in Japan. In view of the extrusion conditions for outer coating of optical communication cables, it is preferable that the flowing temperatures of the aromatic polyester is at least 200° C.

An ordinary screw-type extruder can be used for the melt spinning. The fibers for use in the present invention can be prepared by extruding fibers through the nozzles, followed by winding, or further by stretching and/or heat treatment.

The thus obtained fibers are provided around and along the optical fiber strand as a tension-resistant material, and a synthetic resin coating layer is further formed around and along the tension-resistant material by extrusion molding. The synthetic resin for the coating layer includes, for example, polyethylene, polypropylene, polyethylene terephthalate, polyhexamethylene adipamide, polycaprolactam, polyvinyl chloride, fluorine-based polymer, silicone-based polymer, polyurethane, polyamideimide, polysulfide, polysulfone, synthetic rubber, etc. The extrusion molding can be carried out in an ordinary manner by an ordinary apparatus.

It is important that the optical fiber strand is prevented from direct contact with the synthetic resin coating layer by providing fiber yarns obtained by melt spinning of an aromatic polyester showing an anisotropy in the molten state between the optical fiber strand and the synthetic resin coating layer. When the optical fiber strand and the synthetic resin coating layer are in direct contact with each other, the strand will be broken or damaged by a force applied during the handling such as preparation, transportation, laying, etc., of cables. When an optical fiber strand based on a transparent synthetic resin is used, reduction in transmission loss by heat may be expected, depending on the working temperature. For example, in the formation of a synthetic resin coating layer, the optical fiber strand can be prevented from direct contact with the synthetic resin coating layer by providing the optical fiber strand at the center of a cable. For example, at least two fiber yarns as a tension-resistant material are introduced in parallel with an optical fiber strand by means of a guide to make the fiber yarns surround the optical fiber strand as the center, or to spirally wind the optical fiber strand with the fiber yarns, or to weave the fiber yarns around the optical fiber strand.

An optical communication cable can be also prepared by twisting, or winding a plurality of multifilament yarns of fibers obtained by melt spinning an aromatic polyester showing an anisotropy in the molten state around the optical fiber strand or by surrounding the optical fiber strand with a fabric of the multifilament yarns, or to the contrary, by twisting the optical fiber strand around the multifilament yarns of fibers. The tension-resistant material for use in the present invention can be combined with a plurality of optical fiber strands, or can be used for a coaxial communication cable comprising a copper wire cable and an optical fiber strand.

The tension-resistant material made from an aromatic polyester showing an anisotropy in the molten state has a high tenacity and a high modulus of elasticity, and is free from moisture absorption, and also changes in the coefficient of linear expansion, etc. by temperature in a range of $-60°$ to $+60°$ C. are very small. Thus the present optical communication cable is free from breakage or damages during the preparation, transportation and laying of cables, and also from influences by working atmospheres and is distinguished in the durability. In the formation of a synthetic resin coating layer, the tension-resistant material acts as a heat-insulating material and the transmission loss of the cable is small.

PREFERRED EMBODIMENTS OF THE INVENTION

The present invention will be described in detail below, referring to Reference Example, Examples and Comparative Examples, which however are not limitative of the present invention.

Determination of optical anisotropy was conducted by placing a sample on a heating stage and visually observing the sample under a polarized light while heating the sample at a rate of 25° C./min.

REFERENCE EXAMPLE 7.20 kg (40 moles) of p-acetoxybenzoic acid, 2.49 kg (15 moles) of terephthalic acid, 0.83 kg (5 moles) of isophthalic acid, and 5.45 kg (20.2 moles) of 4,4'-diacetoxydiphenyl were charged into a polymerization tank with comb-type stirring blades, and subjected to polymerization at 330° C. for 3 hours in a nitrogen gas atmosphere with heating and vigorous stirring, while removing acetic acid formed from the polymerization tank. Then, the polymerization tank was gradually cooled to 200° C., and the resulting polymers were taken out of the reaction system, whereby 10.88 kg of the polymers was obtained (which corresponded to 97.8% of theoretical yield).

Then, the polymers were pulverized in a hammer mill (made by Hosokawa Micronmill K.K., Japan) to particles having sizes of not more than 2.5 mm. The particles were treated at 280° C. in a nitrogen gas atmosphere for 5 hours in a rotary kiln. The treated particles had a flowing temperature of 326° C., and the optical anisotropy was observed above 350° C.

The thus obtained polyester was melt spun by a screw-type extruder at a spinning temperature of 370° C. through 512 nozzles having a nozzle diameter of 0.07 mm. The thus obtained yellow transparent fibers were heat treated at 320° C. for 5 hours. The heat-treated fibers had 2.8 deniers (d), a tenacity of 29.0 g/d, an elongation of 2.4%, and a modulus of elasticity of 1,240 g/d. The fibers were then left standing in a thermostat chamber having a constant humidity of 60% RH and a temperature of 23° C. for 24 hours, and the moisture absorption was found 0.0% by thermogravimetric analysis. One yarn of the fibers had 1,434 deniers.

EXAMPLE 1

Figure 2:
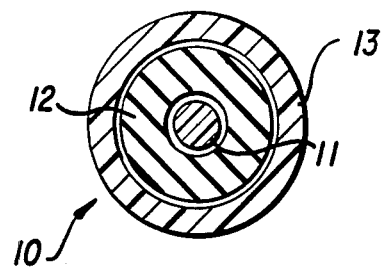
FIG. 2 is a transverse sectional view taken along the line 2—2 of FIG. 1.
Figure 1:
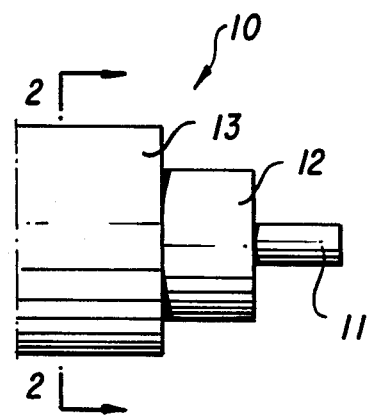
FIG. 1 is a fragmentary view of a fiber optic communication cable with various layers of the cable being exposed.

As illustrated in FIGS. 1 and 2, an optical fiber communication cable 10 comprises an optical fiber strand 11, a synthetic resin coating layer 13, and a tension-resistant material 12 interposed therebetween.

A cable of quartz-based optical fibers was prepared with the fibers of Reference Example as a tension-resistant material.

The optical fiber strand consisted of a quartz glass core having a diameter of about 80 μm and a quartz glass cladding having an outer diameter of about 125 μm, the strand being coated with a synthetic resin to an outer diameter of 0.9 mm.

The optical fiber strand was introduced into a hole having a size of 2 mm in a crosshead die to pass therethrough, and 6 fiber yarns prepared in Reference Example were introduced individually into 6 metallic tubes connected to the hole in the crosshead die to go along the optical fiber strand, and led to the crosshead die. The 6 fiber yarns prepared in Reference Example were provided to symmetrically surround the optical fiber strand as a center. The thus obtained assembly was coated with polyethylene [Sumikasen G-201 (MI=2) made by Sumitomo Chemical Company Ltd., Japan] containing carbon black of 0.1 PHR. The polyethylene was extruded onto the running assembly of the optical fiber strand and the 6 fiber yarns prepared in Reference Example at 190° C. to obtain a polyethylene-coated optical communication cable. The polyethylene coating having a coating thickness of 0.2 mm had a smooth surface, and the optical fiber strand was located at the center of the cable without any direct contact with the polyethylene coating. Transmission loss of the cable was determined with a light having a wavelength of 650 nm, and was found 45 dB/km, the same as that of the optical fiber strand before the preparation of the cable.

The cable was subjected to an impact test by fixing metallic belts to both ends of the polyethylene coating on the cable cut to a length of 120 cm, and one of the metallic belts was fixed, while a weight of 100 g was suspended at the other belt, and the weight was raised up to the same level as that of the fixed end of the belt, and let to fall. This procedure was repeated three times to investigate the transmission loss of the cable. It was found that the transmission loss was 46 dB/km, and no abnormality was observed on the appearance.

COMPARATIVE EXAMPLE 1

Polyethylene terephthalate yarns were used in place of the fiber yarns prepared in Reference Example. The polyethylene terephthalate fibers had 1.38 deniers (d), a tenacity of 8.9 g/d, an elongation of 11.2%, and a modulus of elasticity of 212 g/d, and the yarns had 1,380 deniers. A cable was prepared in the same manner as in Example 1, using the polyethylene terephalate yarns, and the resulting cable, cut to a length of 120 cm, was subjected to an impact test with one hit of a weight of 100 g by dropping. It was found that the optical fiber strand was broken, and the cable was not practically used.

COMPARATIVE EXAMPLE 2

Aramid fiber yarns were used in place of the fiber yarns prepared in Reference Example, and an optical communication cable was prepared in the same manner as in Example 1, using the aramid fiber yarns. The aramid fibers had 1.47 deniers (d), a tenacity of 23.2 g/d, an elongation of 2.6%, a modulus of elasticity of 892 g/d, and a moisture absorption of 2.9%, and the yarns had 1,420 deniers. Local foaming was observed in the polyethylene coating on the thus prepared cable.

EXAMPLE 2

An optical communication cable was prepared with a synthetic resin-based optical fiber strand and the fibers prepared in Reference Example. The optical fiber strand was prepared by polymerizing methyl methacrylate containing no foreign matters and no impurities, melt spinning the polymers, and coating the fibers with a fluorine resin, on the outside, and had a diameter of 1 mm. A polyethylene-coated optical communication cable was prepared in the same manner as in Example 1, and subjected to determination of transmission loss with a light having a wavelength of 570 nm. The transmission loss of optical fiber strand before the preparation of the cable was 273 dB/km, whereas that of the cable after the polyethylene coating was 275 dB/km. The cable, cut to a length of 120 cm, was subjected to an impact test with a weight of 100 g in the same manner as in Example 1 by suspending the weight at one end of the cable, followed by drop hitting. After the test, the transmission loss was found 279 dB/km.

COMPARATIVE EXAMPLE 3

An optical communication cable was prepared with the synthetic resin-based optical fiber strand used in Example 2 by direct coating of the optical fiber strand with polyethylene without using the tension-resistant material.

The transmission loss of the thus obtained cable was determined with a light having a wavelength of 570 nm, and found more than 1,000 dB/km.

What is claimed is:

1. An optical communication cable which comprises an optical fiber strand, a tension-resistant material which does not absorb moisture surrounding the optical fiber strand, and a synthetic resin coating layer, the tension-resistant material being provided between the optical fiber strand and the synthetic resin coating layer and being fibers obtained by melt spinning an aromatic polyester showing anisotropy in the molten state.

* * * * *